US012140885B2

(12) United States Patent
Watanabe et al.

(10) Patent No.: US 12,140,885 B2
(45) Date of Patent: Nov. 12, 2024

(54) IMAGE FORMING APPARATUS INCLUDING BRUSH FOR SURFACE OF DEVELOPER SUPPLYING MEMBER

(71) Applicant: CANON KABUSHIKI KAISHA, Tokyo (JP)

(72) Inventors: Takanori Watanabe, Kanagawa (JP); Shinsuke Kobayashi, Kanagawa (JP); Kazuhiro Funatani, Kanagawa (JP); Kensuke Umeda, Kanagawa (JP); Ai Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/866,669

(22) Filed: Jul. 18, 2022

(65) Prior Publication Data

US 2022/0350274 A1 Nov. 3, 2022

Related U.S. Application Data

(63) Continuation of application No. 17/330,517, filed on May 26, 2021, now Pat. No. 11,422,485.

(30) Foreign Application Priority Data

Jun. 1, 2020 (JP) ................................ 2020-095461

(51) Int. Cl.

*G03G 15/08* (2006.01)
*G03G 15/095* (2006.01)
*G03G 21/00* (2006.01)

(52) U.S. Cl.

CPC ....... *G03G 15/0887* (2013.01); *G03G 15/095* (2013.01); *G03G 21/0064* (2013.01)

(58) Field of Classification Search

CPC ............. G03G 15/0887; G03G 15/095; G03G 15/0896; G03G 21/0035; G03G 21/0064; G03G 21/007

See application file for complete search history.

(56) References Cited

U.S. PATENT DOCUMENTS 5,122,838 A 6/1992 Kohyama
5,708,621 A 1/1998 Yagi et al.
(Continued)

FOREIGN PATENT DOCUMENTS

CN 102053536 A 5/2011
CN 106125526 A 11/2016
(Continued)

OTHER PUBLICATIONS

English machine translation of Akamatsu et al. (JP2017058601A) (Year: 2017).*

(Continued)

*Primary Examiner* — Walter L Lindsay, Jr.
*Assistant Examiner* — Geoffrey T Evans
(74) *Attorney, Agent, or Firm* — Venable LLP

(57) ABSTRACT

A cartridge attachable to and detachable from an image forming apparatus forming an image on a recording material, the cartridge includes: an image bearing member; a developer container that contains therein a developer; a developing member that is rotatable and carries the developer supplied from the developer container and supplies the developer to the image bearing member; a developer supplying member that is rotatable and provided in the developer container and in contact with the developing member to supply the developer to a surface of the developing member; and a contact member provided in the developer container and in contact with a surface of the developer supplying member, wherein the developer remaining on the image bearing member after image formation is collected to the developing member, and the developer collected to the developing member is collected into the developer container.

8 Claims, 6 Drawing Sheets

(56) References Cited

U.S. PATENT DOCUMENTS

| | | | |
|---|---|---|---|
| 5,966,567 | A | 10/1999 | Matsuzaki et al. |
| 6,144,815 | A | 11/2000 | Chadani et al. |
| 6,154,623 | A | 11/2000 | Suzuki et al. |
| 6,173,140 | B1 | 1/2001 | Suzuki et al. |
| 6,173,145 | B1 | 1/2001 | Chadani et al. |
| 6,205,305 | B1 | 3/2001 | Suzuki et al. |
| 6,219,504 | B1 | 4/2001 | Matsuzaki et al. |
| 6,246,853 | B1 | 6/2001 | Suzuki et al. |
| 6,282,389 | B1 | 8/2001 | Matsuzaki et al. |
| 6,349,182 | B2 | 2/2002 | Otsubo et al. |
| 6,415,121 | B1 | 7/2002 | Suzuki et al. |
| 6,549,736 | B2 | 4/2003 | Miyabe et al. |
| 6,654,578 | B2 | 11/2003 | Suzuki et al. |
| 6,711,371 | B2 | 3/2004 | Koyama et al. |
| 6,771,920 | B2 | 8/2004 | Abe et al. |
| 6,795,666 | B2 | 9/2004 | Miyabe et al. |
| 6,799,001 | B2 | 9/2004 | Takeuchi et al. |
| 6,868,243 | B2 | 3/2005 | Watanabe et al. |
| 6,931,226 | B2 | 8/2005 | Chadani et al. |
| 6,934,485 | B2 | 8/2005 | Miyabe et al. |
| 7,099,607 | B2 | 8/2006 | Suzuki et al. |
| 7,128,211 | B2 | 10/2006 | Nishi et al. |
| 7,464,520 | B2 | 12/2008 | Nishi et al. |
| 7,681,379 | B2 | 3/2010 | Nishi et al. |
| 9,465,322 | B2 | 10/2016 | Matsukawa et al. |
| 2003/0002884 | A1 | 1/2003 | Yamada et al. |
| 2005/0008403 | A1 | 1/2005 | Kweon |
| 2006/0067742 | A1 | 3/2006 | Hattori et al. |
| 2006/0120754 | A1 | 6/2006 | Suzuki et al. |
| 2009/0103949 | A1 | 4/2009 | Chiba |
| 2009/0257784 | A1 | 10/2009 | Izumi et al. |
| 2011/0103843 | A1 | 5/2011 | Sato |
| 2013/0287450 | A1 | 10/2013 | Hayashi et al. |
| 2014/0356019 | A1* | 12/2014 | Toichi ................ G03G 21/0035 399/101 |
| 2020/0004194 | A1 | 1/2020 | Noguchi et al. |

FOREIGN PATENT DOCUMENTS

| | | | |
|---|---|---|---|
| JP | H03-004276 | A | 1/1991 |
| JP | 08-030099 | A | 2/1996 |
| JP | H08-137257 | A | 5/1996 |
| JP | 2598131 | B2 | 4/1997 |
| JP | 2000-321951 | A | 11/2000 |
| JP | 2002-323814 | A | 11/2002 |
| JP | 2002-365891 | A | 12/2002 |
| JP | 2007-057620 | A | 3/2007 |
| JP | 2009-116069 | A | 5/2009 |
| JP | 2017-058601 | A | 3/2017 |

OTHER PUBLICATIONS

Dec. 13, 2023 Office Action in Chinese Patent Application Pub. No. 202110598761.1.

Feb. 20, 2024 Japanese Official Action in Japanese Patent Appln. No. 2020-095461.

* cited by examiner

IMAGE FORMING APPARATUS INCLUDING BRUSH FOR SURFACE OF DEVELOPER SUPPLYING MEMBER

BACKGROUND OF THE INVENTION

Field of the Invention

The present invention relates to a development device, a cartridge, and an image forming apparatus.

Description of the Related Art

In recent years, in an image forming apparatus such as an electrophotographic apparatus or an electrostatic recording apparatus, a cleanerless system (toner recycle system) has been proposed from a viewpoint of simplifying a device configuration and eliminating a waste material. Such a cleanerless system uses a configuration obtained by removing, from a transfer-type image forming apparatus, a cleaning means for removing and cleaning up, from a photosensitive drum, a residual toner on the photosensitive drum after a transfer step. By a development device, the untransferred toner on the photosensitive drum after the transfer step is cleaned up and removed therefrom to be collected into the development device.

As described in Japanese Patent No. 2598131, performing cleaning while performing development using a development device is referred to as cleaning performed concurrently with development. The cleaning performed concurrently with development is a method which collects a toner remaining on a photosensitive drum after the transfer step by using a fog removal voltage (a fog removal potential difference Vback corresponding to a potential difference between a dc voltage applied to the development device and a surface potential of the photosensitive drum) during development in or after a next step.

The method allows the untransferred toner to be collected into the development device and re-used in or after the next step and can thus allow easy maintenance, while eliminating the waste toner. In addition, since the method features a cleanerless mode, an additional cleaner mechanism is no longer provided, which offers a great space advantage and can greatly reduce a size of the image forming apparatus.

SUMMARY OF THE INVENTION

In the case of using a cleanerless system, when a toner (developer) is recycled, a foreign substance such as paper dust may enter a development device. When a toner capacity of the development device is increased or a so-called toner supply system that supplies only a toner as a consumable item is used with the view to elongating the life of the development device, an amount of the paper dust collected into the development device increases. The paper dust collected into the development device circulates together with the toner in the development device. When a roller having a cell structure, such as foamed rubber, is used as a toner supplying roller for supplying the toner to a development roller, the paper dust enters cells with the use of the toner supplying roller, and the paper dust is deposited on a surface of the toner supplying roller.

When the paper dust deposited on the surface of the toner supplying roller is supplied together with the toner to the development roller serving as a developing member, the paper dust larger in size than the toner is held between a toner regulating member and the development roller to interrupt regulation of a toner thickness and thereby cause an image defect in the form of vertical streaks. In recent years, as users are increasingly diversified and types of paper to be used are also diversified, there is paper which generates a large amount of paper dust. There is also a recording medium which generates another foreign substance other than the paper dust as a foreign sub stance.

The present invention is achieved in order to solve the problem described above, and an object of the present invention is to prevent a foreign substance having entered a developer container from being supplied together with a developer to a developing member.

In order to achieve the object described above, a cartridge attachable to and detachable from an image forming apparatus forming an image on a recording material, the cartridge includes: an image bearing member; a developer container that contains therein a developer; a developing member that is rotatable and carries the developer supplied from the developer container and supplies the developer to the image bearing member; a developer supplying member that is rotatable and provided in the developer container and in contact with the developing member to supply the developer to a surface of the developing member; and a contact member provided in the developer container and in contact with a surface of the developer supplying member, wherein the developer remaining on the image bearing member after image formation is collected to the developing member, and the developer collected to the developing member is collected into the developer container.

Further features of the present invention will become apparent from the following description of exemplary embodiments with reference to the attached drawings.

DESCRIPTION OF THE EMBODIMENTS

Figure 1:
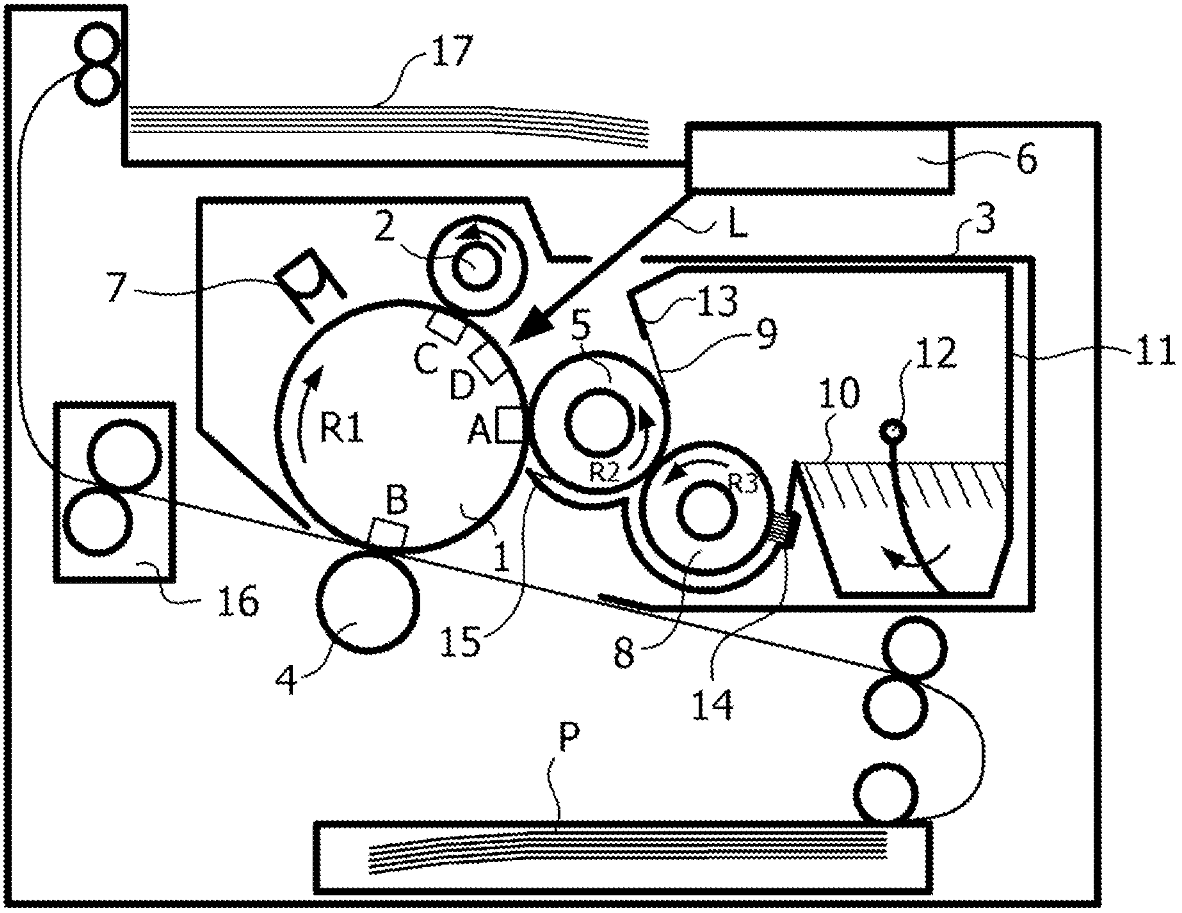
FIG. 1 is a schematic configuration diagram of an image forming apparatus according to a first embodiment.

Referring to the drawings, forms for carrying out this invention will be illustratively described below in detail based on embodiments thereof. However, dimensions, materials, shapes, and relative positioning of components described in the embodiments and the like are to be appropriately changed in accordance with a configuration of an apparatus to which the invention is applied and various conditions, and are not intended to limit the scope of the invention to the following embodiments.

First Embodiment

Image Forming Apparatus

FIG. 1 is a schematic configuration diagram illustrating an example of an image forming apparatus according to the first embodiment. The first embodiment uses a monochrome laser beam printer which uses a non-magnetic mono-component development method to collect a developer after transfer simultaneously with development. The image forming apparatus in the first embodiment is applicable to various electrophotographic recording apparatuses such as a digital copier, an LBP (laser beam printer), and an LED printer.

The image forming apparatus according to the first embodiment includes a photosensitive drum 1 serving as an image bearing member that bears an electrostatic latent image, a charging roller 2 serving as a charging member for charging the photosensitive drum 1, and a laser scanner 6 serving as an exposure device that forms the electrostatic latent image on the photosensitive drum 1. The image forming apparatus according to the first embodiment also includes a development device 3 that develops the electrostatic latent image formed by the laser scanner 6 to provide a toner image and a transfer roller 4 serving as a transfer member that transfers the obtained toner image onto a recording material P serving as a transferred material. The image forming apparatus according to the first embodiment further includes a residual potential removal device 7 that removes a residual potential on the photosensitive drum 1 after the transfer roller 4 performs the transfer and a fixing device (heat fixing device) 16 that applies heat and pressure to a toner on the recording material P to fix the toner onto the recording material P.

The image forming apparatus according to the first embodiment has a configuration of a process cartridge, in which the photosensitive drum 1, the charging roller 2, the development device 3, and the like are integrated, and which is attachable to and detachable from a main body of the image forming apparatus, but the image forming apparatus can also be of a stationary installation type. The process cartridge (cartridge) includes the photosensitive drum 1, the charging roller 2, the development device 3, and the like. The photosensitive drum 1 is a negative-polarity OPC photosensitive member having a diameter of 20 mm. The photosensitive drum 1 can be rotated by a drive source for the photosensitive drum 1 not shown at a peripheral speed (process speed or printing speed) of 150 mm/sec in a direction indicated by an arrow R1 in FIG. 1.

The charging roller 2 uniformly charges a surface of the photosensitive drum 1. The charging roller 2 is a conductive elastic roller including a core metal and a conductive elastic layer covering the core metal. The charging roller 2 is in pressure contact with the photosensitive drum 1 under a predetermined pressing force. Of the surface of the photosensitive drum 1, a portion to be brought into pressure contact with the charging roller 2 is a charged portion C. The charging roller 2 is also driven to rotate, while having a predetermined peripheral speed difference with the photosensitive drum 1. The image forming apparatus according to the first embodiment has a charging power source that applies a charging voltage to the charging roller 2. The charging power source applies a dc voltage to the core metal of the charging roller 2. The dc voltage is set to a value such that a potential difference between a surface potential of the photosensitive drum 1 and a potential of the charging roller 2 is at least a discharge start voltage.

The laser scanner 6 serving as the exposure device applies, to the photosensitive drum 1, laser light L controlled to be turned ON/OFF in response to an image signal input to the image forming apparatus to form the electrostatic latent image (digital latent image) on the photosensitive drum 1. The image signal may also be a test pattern signal generated in the main body of the apparatus. Of the surface of the photosensitive drum 1, a portion to which the laser light L is applied is an exposure portion D.

Note that the exposure device used in the first embodiment is not limited to the laser scanner, and an exposure device of an LED print head type, a liquid crystal shutter array type, or the like can also be used appropriately. As a method of modulating the image signal mentioned above to be input to the exposure device to obtain a density gradation, an area coverage modulation method such as laser light intensity modulation, an error diffusion method, or a dither method is used preferably. Such methods may also be combined with each other. It is also preferable to use a PWM (pulse width modulation) method to record multiple values resulting from area coverage modulation of one pixel. It is also possible to change the image signal at 256 gradation levels from 00h (white) to FFh (black). In the first embodiment, the PWM method is used.

When a negatively charged toner is used, the surface potential of the photosensitive drum 1 is such that a non-image-portion potential (Vd) is preferably in a range of −500 V to 1000 V. Meanwhile, an image-portion potential (Vl) which allows a maximum toner image density to be obtained is preferably in a range of −50 V to −200 V. Likewise, when a positively charged toner is used, the non-image-portion potential (Vd) is preferably in a range of +500 V to +1000 V, while the image-portion potential (Vl) which allows the maximum toner image density to be obtained is preferably in a range of +50 V to +200 V. In the first embodiment, the negatively charged toner is used, and the surface potential of the photosensitive drum 1 will be described later.

The development device 3 includes a toner container 11 serving as a developer container containing therein a toner 10 serving as a developer to hold the toner 10, a development roller 5 serving as a developing member, and a development blade 9 serving as a regulating member. The toner 10 is, e.g., a non-magnetic single component toner (non-magnetic single component developer). The development device 3 also includes a toner supplying roller 8 serving as a developer supplying member, a contact brush 14 serving as a removal member (contact member), a stirring member 12, and the like. The toner supplying roller 8, the contact brush 14, and the stirring member 12 are provided in the toner container 11 (developer container), and the toner supplying roller 8 is in contact with the development roller 5. In a rotation direction (direction indicated by an arrow R2) of the development roller 5, on a downstream side of respective contact portions of the photosensitive drum 1 and the development roller 5, an ejection prevention sheet 15 for preventing the toner from being ejected from inside the toner container 11 to the outside thereof is provided. Of the surface of the photosensitive drum 1, a portion to be brought into pressure contact with the development roller 5 is a development portion A. Details of the development device 3 and the contact brush 14 will be described later.

The development roller 5 is provided to be rotative relative to the development device 3. The development roller 5 carries the toner 10 supplied from the toner container 11 to supply the toner 10 to the photosensitive drum 1. When the toner is supplied from the development roller 5 to the photosensitive drum 1 to develop the electrostatic latent image formed on the photosensitive drum 1, a development high voltage serving as a development voltage is applied to the development roller 5. The development high voltage is a dc voltage. A contrast potential |Vl−Vdc| (Vcont) corresponding to a potential difference between a development high voltage value (Vdc) and the image-portion potential (Vl) which allows the maximum toner image density to be obtained is preferably in a range of 50 V to 400 V.

The transfer roller 4 having a medium resistance and serving as a contact transfer means is in contact with the surface of the photosensitive drum 1 under a predetermined pressing force. Of the surface of the photosensitive drum 1, a portion to be brought into pressure contact with the transfer roller 4 is a transfer portion B. The transfer roller 4 in the first embodiment is configured to include a core metal and a medium-resistance foam layer covering the core metal and uses a roller having a roller resistance value of $5\times10^{8}\Omega$. A transfer high-voltage power source not shown applies a voltage of +2.0 kV to the core metal. In the transfer portion B, the toner image on the surface of the photosensitive drum 1 is transferred onto the recording material P. The transfer roller 4 is driven via the photosensitive drum 1. The fixing device 16 applies heat and pressure to the recording material P having the toner image transferred thereto to fix the toner image onto the recording material P.

Explanation of Development Device

Figure 3:
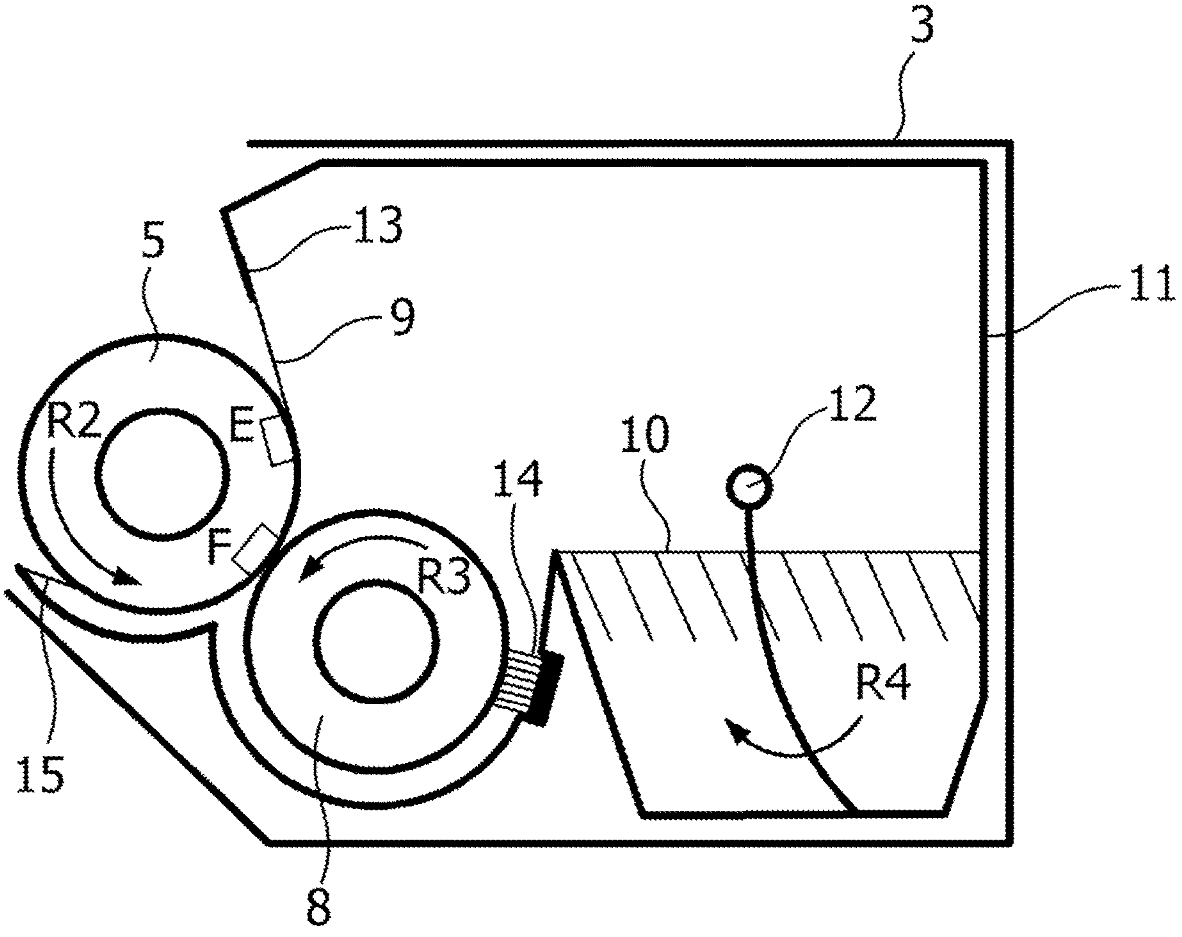
FIG. 3 is an enlarged diagram of a development device according to the first embodiment.

Next, referring to FIG. 3, a description will be given of the details of the development device 3 according to the first embodiment. FIG. 3 is a schematic configuration diagram illustrating an example of the development device 3 according to the first embodiment. The development roller 5 in the first embodiment is a roller having a multi-layer structure including a core metal having a diameter of 6 mm and a conductive elastic layer formed around the core metal. An outer diameter of the development roller 5 is 10 mm. The core metal of the development roller 5 is formed of a metal such as aluminum, an aluminum alloy, or stainless steel.

The conductive elastic layer of the development roller 5 includes a base layer and a surface layer over the base layer. The base layer of the conductive elastic layer is formed of rubber such as butadiene-acrylonitrile rubber (NBR), ethylene-propylene-diene polyethylene (EPDM), silicone rubber, or urethane rubber. The surface layer of the conductive elastic layer is formed of ether urethane, nylon, or the like. The conductive elastic layer is not limited to such configurations, and it is also possible to use a foam layer made of sponge or the like as the based layer of the conductive elastic layer and use a rubber elastic layer as the surface layer of the conductive elastic layer. Alternatively, the conductive elastic layer may also have a single-layer configuration made only of a rubber elastic layer made of the NBR, the EPDM, the urethane rubber, or the like.

In the first embodiment, the development roller 5 receives a drive force from a development roller drive source not shown to be driven to rotate in the direction indicated by the arrow R2 in FIG. 3, while being in contact with the development portion A of the photosensitive drum 1. The development roller 5 has inroad amount regulating rollers disposed at both end portions in a longitudinal direction (rotation axis direction) thereof. The inroad amount regulating rollers are brought into contact with the photosensitive drum 1 to set an amount of intrusion of the development roller 5 into the surface of the photosensitive drum 1 to a predetermined value.

Over the development roller 5, the development blade 9 is supported by a support plate 13. The development blade 9 is provided in the toner container 11 such that a free-end-side tip portion of the development blade 9 is in surface contact with an outer peripheral surface of the development roller 5. Of the development roller 5, a portion (contact portion) with which the development blade 9 is brought into contact is a regulation target portion E. The development blade 9 regulates a thickness of the toner carried on a surface of the regulation target portion E of the development roller 5, while giving charges to the toner through rubbing. In a state where the development blade 9 is in contact with the development roller 5, the tip portion of the development blade 9 faces an upstream side in a rotation direction of the development roller 5. In other words, the direction in which the tip portion of the development blade 9 comes into contact with the development roller 5 corresponds to a direction in which the tip portion is located on the upstream side in the rotation direction of the development roller 5, i.e., a so-called counter direction.

The development blade 9 is a metal thin plate having spring elasticity, such as a stainless steel thin plate or a phosphor bronze thin plate, which is in contact with the surface of the development roller 5 under a predetermined linear pressure. To the support plate 13 serving as a support member for the development blade 9, a blade voltage is applied by a voltage application means not shown so as to provide a predetermined potential difference between the development roller 5 and the development blade 9. When the toner 10 is, e.g., a negatively charged toner, a potential of the development blade 9 is set to be higher on a negative polarity side than a potential of the development roller 5. In the first embodiment, a stainless steel thin plate having spring elasticity and a thickness of 0.1 mm is used for the development blade 9. Also, in the first embodiment, the blade voltage is applied such that the potential of the development blade 9 is −200 V relative to the potential of the development roller 5. For example, when a development voltage of −350 V is applied to the development roller 5 and the potential of the development roller 5 is −350 V, the potential of the development blade 9 is −550 V. This improves a property of giving charges to the toner.

In another example of the development blade 9, it may also be possible to use a configuration in which a polyamide elastomer serving as an elastic member is bonded to or formed by injection molding on a tip portion of a metal thin plate having spring elasticity, and the elastic member is brought into contact with the surface of the development roller 5 under a predetermined linear pressure. In this case, when a pressure contact force applied by the development blade 9 to the development roller 5 is maintained by using the metal thin plate and the toner 10 is, e.g., a negatively charged toner, a negatively charged property is given by the polyamide elastomer to the toner. Note that the metal thin plate is not particularly limited as long as the metal thin plate maintains the pressure contact force of the development blade 9. The elastic member can also be selected in consideration of the charged property of the toner. To further add charging performance, it is also possible to provide the elastic member with conductivity and use the elastic member in combination with the blade voltage.

In the first embodiment, the toner 10 having the thickness regulated by the development blade 9 and carried on the development roller 5 is the non-magnetic single component toner. Accordingly, as a force to hold the toner 10 on the development roller 5, only a reflection force due to the charges of the toner 10 and a van der Waals force act. As a result, when a toner layer on the development roller 5 is thickened, the reflection force exerted on the toner 10 present in an upper layer portion of the toner layer is weakened, and the toner 10 can no longer be carried on the development roller 5 and the toner 10 is dispersed. Therefore, it is necessary to thin the toner layer on the development roller 5 and thereby enhance the holding force exerted on the toner 10 but, consequently, it may be difficult to obtain a sufficient image density. In such a case, by setting a peripheral speed of the development roller 5 higher than the peripheral speed of the photosensitive drum 1, it is possible to obtain the image density. The respective peripheral speeds of the photosensitive drum 1 and the development roller 5 are preferably set such that a peripheral speed ratio of the development roller 5 to the photosensitive drum 1 is in a range of at least 1.1 and not more than 3. In the first embodiment, the respective peripheral speeds of the photosensitive drum 1 and the development roller 5 are set such that the peripheral speed ratio of the development roller 5 to the photosensitive drum 1 is 1.5.

The toner supplying roller 8 is rotatively provided in the toner container 11. The toner supplying roller 8 comes into contact with a supply portion F of the development roller 5 to supply the toner 10 in the toner container 11 to the surface of the development roller 5. The toner supplying roller 8 also scrapes the toner remaining undeveloped (development residual toner) on the development roller 5 therefrom after image formation and collects the development residual toner. The toner supplying roller 8 may be a roller having a sponge structure or a roller having a fur brush structure. The toner supplying roller 8 having the sponge structure includes a core metal serving as a rotation shaft portion and a foamed elastic body provided around the core metal. The toner supplying roller 8 having the fur brush structure includes a core metal serving as a rotation shaft portion and fibers made of rayon, nylon, or the like provided around the core metal. In terms of supplying the toner 10 to the development roller 5 and scraping the development residual toner, the toner supplying roller 8 having the sponge structure or the toner supplying roller 8 having the fur brush structure is used preferably.

As the sponge structure using the foamed elastic body, an independently foaming structure in which inner cells are independent of each other or a continuously foaming structure in which inner cells are connected to each other can be used. In the continuously foaming structure, an amount of the toner that can be internally stored is large. Therefore, by using the continuously foaming structure, it is possible to stably supply the toner 10. The first embodiment uses, as the toner supplying roller 8, a foam roller in which a foamed elastic body is provided over a metal core having a diameter of 5 mm. A diameter of the foam roller is 11 mm. The first embodiment also uses, as the foamed elastic body, an elastic body obtained by dispersing carbon or the like in a continuously foaming polyurethane foam having cells connected to each other and having diameters of at least 10 μm and not more than 800 μm to provide the polyurethane foam with conductivity.

The toner supplying roller 8 comes into contact with the development roller 5 and rotates in a direction (the counter direction) indicated by an arrow R3. In the first embodiment, the development roller 5 and the toner supplying roller 8 rotate such that an absolute value of a surface movement speed of the toner supplying roller 8 is 75% of a surface movement speed of the development roller 5. In terms of supplying the toner to the development roller 5 and scraping the development residual toner, it is preferable to bring the toner supplying roller 8 into contact with the development roller 5 such that an amount of intrusion of the toner supplying roller 8 into the development roller 5 is in a range from at least 0.1 mm to not more than 1.5 mm. In the first embodiment, the amount of intrusion of the toner supplying roller 8 into the development roller 5 is set to 1.0 mm.

Since the toner supplying roller 8 is in contact with the supply portion F of the development roller 5 with a predetermined amount of intrusion, in the toner supplying roller 8, cells in a collapsed state are in contact with the supply portion F of the development roller 5. When the toner supplying roller 8 rotates in the direction indicated by the arrow R3, the collapsed cells are released on a downstream side of the supply portion F in a rotation direction of the toner supplying roller 8 to be restored to an original state. As a result, the toner 10 around the cells are taken into the cells, while the toner supplying roller 8 collects the development residual toner by using cell walls to scrape the development residual toner on the development roller 5. The toner supplying roller 8 further rotates in the direction indicated by the arrow R3, the cells are collapsed on an upstream side of the supply portion F in the rotation direction of the toner supplying roller 8, and consequently the toner 10 in the cells is supplied to the development roller 5.

From a viewpoint of toner circulation in the vicinity of the toner supplying roller 8, a gap between the toner supplying roller 8 and the toner container 11 is preferably in a range of from at least 0.3 mm to not more than 2.0 mm. When the gap is smaller than 0.3 mm, the circulation of the toner 10 is interrupted, and an amount of the toner taken on the downstream side of the supply portion F in the rotation direction of the toner supplying roller 8 is insufficient. When the gap is larger than 2.0 mm, the toner 10 does not circulate and stays between the toner supplying roller 8 and the toner container 11, resulting in an increased amount of the unused toner 10. In the first embodiment, the gap between the toner supplying roller 8 and the toner container 11 is set to 1.0 mm.

To allow a predetermined potential difference to be formed between the development roller 5 and the toner supplying roller 8, a toner supplying roller voltage is applied by a voltage application means not shown to the core metal of the toner supplying roller 8. When the negatively charged toner 10 is supplied to the development roller 5, the toner supplying roller voltage is applied such that, e.g., a potential of the toner supplying roller 8 is −200 V relative to the potential of the development roller 5. For example, when a development voltage of −350 V is applied to the development roller 5 and the potential of the development roller 5 is −350 V, the potential of the toner supplying roller 8 is −550 V. This allows the supplying of the toner from the toner supplying roller 8 to the toner development roller 5 to be stably performed. In addition, the contact brush 14 is in contact with a surface of the toner supplying roller 8 with a predetermined amount of intrusion. The contact brush 14 removes a foreign substance from the surface of the toner supplying roller 8.

The contact brush 14 according to the first embodiment is a brush-shaped member. The contact brush 14 has a facing surface facing the surface of the toner supplying roller 8, and fibrous members provided on the facing surface of the contact brush 14 extend in a direction perpendicular to the facing surface of the contact brush 14. The contact brush 14 may also be disposed in a groove formed in an inner wall of the toner container 11. In this case, the contact brush 14 is disposed in the groove formed in the inner wall of the toner container 11 such that a tip portion of each of the fibrous members of the contact brush 14 protrudes from an inner wall surface of the toner container 11. The contact brush 14 may also be disposed on the inner wall surface of the toner container 11.

The stirring member 12 is rotatively disposed in the toner container 11 to stir the toner 10 in the toner container 11 and convey the toner 10 to the toner supplying roller 8. The stirring member 12 is configured to include a backed-up shaft rod member formed of a resin material and a PPS film sheet and rotate in a direction indicated by an arrow R4 in FIG. 3. A drive force for rotating the stirring member 12 is used by, e.g., a development roller drive means by reducing a rotation speed to an appropriate level by using a gear train.

Image Forming Process

Next, referring to FIG. 1, a description will be given of an outline of an image forming process. First, when a print signal is input to a controller of the main body of the image forming apparatus, the image forming apparatus starts an image forming operation. Then, with predetermined timing, each of drive units starts to move so as to apply a voltage to each of the members, the devices, and the like. The photosensitive drum 1 driven to rotate is uniformly charged by the charging roller 2 in the charged portion C. The uniformly charged photosensitive drum 1 is exposed to the laser light L from the laser scanner 6 in the exposure portion D, and an electrostatic latent image is formed on the surface of the photosensitive drum 1. Then, to the electrostatic latent image, the toner 10 is supplied by the development roller 5 in the development portion A to be visualized as a toner image, and the toner image is formed on the photosensitive drum 1. The toner image visualized and formed on the photosensitive drum 1 is transferred onto the recording material P held between and conveyed by the photosensitive drum 1 and the transfer roller 4 in the transfer portion B. The recording material P having the toner image formed thereon is conveyed to the fixing device 16. In the fixing device 16, the toner image on the recording material P is thermally fixed, and the recording material P is conveyed onto a transfer tray 17 to thereby end the sequential image forming process. Thus, the image forming apparatus performs the image formation.

Cleanerless System

Next, a detailed description will be given of the cleanerless system in the first embodiment. The first embodiment uses a so-called cleanerless system in which a cleaning member for removing, from over the photosensitive drum 1, the untransferred toner remaining on the photosensitive drum 1 without being transferred onto the recording material P is not provided in the image forming apparatus. The untransferred toner remaining on the photosensitive drum 1 after a transfer step is negatively charged by discharging in a gap portion before the respective contact portions (the charged portion C) of the photosensitive drum 1 and the charging roller 2, similarly to the photosensitive drum 1. Specifically, as a charging voltage, a dc voltage of −1500 V is applied to the charging roller 2. At this time, the surface of the photosensitive drum 1 is uniformly charged to a surface potential (Vd) of −900 V. The untransferred toner negatively charged passes through the charged portion C without adhering to the charging roller 2 due to a potential difference relationship (the surface potential of the photosensitive drum 1 is −900 V, while the potential of the charging roller 2 is −1500 V) in the charged portion C. In the first embodiment, to cause the untransferred toner to pass through the charged portion C without adhering to the charging roller 2, the following two configurations are used in addition to the potential difference relationship.

A description will be given of the first configuration. In the first configuration, as illustrated in FIG. 1, the residual potential removal device 7 is provided between the transfer roller 4 and the charging roller 2 in the rotation direction (direction indicated by the arrow R1) of the photosensitive drum 1. To cause stable discharging in the charged portion C, the residual potential removal device 7 optically neutralizes the surface potential of the photosensitive drum 1 after passing through the transfer portion B. The residual potential removal device 7 adjusts the potential of an entire surface region of the photosensitive drum 1 before being charged in the longitudinal direction (rotation axis direction) thereof to about −100 V. This can cause uniform discharging during charging processing and uniformly negatively charge the untransferred toner. As a result, the untransferred toner passes through the charged portion C.

A description will be given of the second configuration. In the second configuration, the photosensitive drum 1 and the charging roller 2 are driven to rotate, while a predetermined peripheral speed difference is provided between the photosensitive drum 1 and the charging roller 2. As described above, as a result of the discharging, a major part of the toner 10 is negatively charged, while a small amount of the toner 10 remains negatively uncharged. The negatively uncharged toner 10 may adhere to the charging roller 2 in the charged portion C. To prevent this, by providing the predetermined peripheral speed difference between the photosensitive drum 1 and the charging roller 2 and driving the photosensitive drum 1 and the charging roller 2 to rotate, it is possible to negatively charge the uncharged toner 10 through rubbing between the photosensitive drum 1 and the charging roller 2. This achieves an effect of preventing the toner 10 from adhering to the charging roller 2. In the first embodiment, the core metal of the charging roller 2 is provided with a charging roller gear, and the charging roller gear is engaged with a drum gear provided at an end portion of the photosensitive drum 1. Consequently, as the photosensitive drum 1 is driven to rotate, the charging roller 2 is also driven to rotate.

The peripheral speed of the surface of the charging roller 2 according to the first embodiment is set to be 115% of the peripheral speed of the surface of the photosensitive drum 1. The untransferred toner having passed through the charged portion C reaches a laser application position on the surface of the photosensitive drum 1 to which the laser light L is applied. Since the amount of the untransferred toner is not so large to block the laser light L from the laser scanner 6, the untransferred toner does not affect a step of forming the electrostatic latent image on the photosensitive drum 1. Of the untransferred toner having passed through the laser application position, the untransferred toner located in a non-exposure (the surface of the photosensitive drum 1 to which the laser has not been applied) is collected by an electrostatic force to the development roller 5 in the development portion A.

To reliably place the toner 10 on an image portion, Vcont is set and, to ensure collection of the untransferred toner, a back contrast potential |Vd−Vdc| (Vback) corresponding to a potential difference between a development high voltage value (Vdc) and the non-image-portion potential (Vd) is increased. By increasing Vback, the potential difference between the photosensitive drum 1 and the development roller 5 is increased to increase an electrostatic force to pull the untransferred toner having passed through the charged portion C back to the development roller 5 and ensure the collection of the untransferred toner to the development roller 5. Accordingly, potentials for the electrostatic latent image in the first embodiment are set to satisfy Vd=−900 V, Vl=−120 V, Vdc=−350 V, |Vcont|=230 V, and |Vback|=550 V.

Meanwhile, of the untransferred toner having passed through the laser application position, the untransferred toner located in the exposure portion D (the surface of the photosensitive drum 1 to which the laser has been applied) is not electrostatically collected, but forms a portion of a toner image together with the newly developed toner 10 to be transferred onto the recording material Pin the transfer portion B. A portion of the untransferred toner may also be collected by to the development roller 5 by a physical force resulting from the peripheral speed difference between the development roller 5 and the photosensitive drum 1. Thus, after the image formation, the toner 10 remaining on the photosensitive drum 1 is collected to the development roller 5, and the toner collected to the development roller 5 is collected into the toner container 11. Thus, the toner 10 untransferred onto the recording material P and remaining on the photosensitive drum 1 is generally collected by the development device 3. Then, the toner 10 collected by the development device 3 is mixed with the toner 10 remaining in the development device 3 to be used.

In such a cleanerless system, particularly in such a configuration as used in the first embodiment in which the toner image is transferred directly from the photosensitive drum 1 onto the recording material P such as paper, a foreign substance such as paper dust generated from the paper adheres to the surface of the photosensitive drum 1. To the paper dust on the surface of the photosensitive drum 1, the charging roller 2 gives charges in the charged portion C, and the paper dust may be collected to the development roller 5 in the development portion A by an electrical force resulting from a potential difference between the development roller 5 and the photosensitive drum 1 and by the physical force resulting from the peripheral speed difference between the development roller 5 and the photosensitive drum 1.

The paper dust collected to the development roller 5 is scraped together with the development residual toner by the toner supplying roller 8 in the supply portion F. The paper dust scraped by the toner supplying roller 8 is stirred together with the toner 10 in the toner container 11 to circulate in the toner container 11, and a portion of the paper dust enters the cells in the toner supplying roller 8. As the number of passed sheets increases, an amount of the paper dust collected by the development device 3 also increases, and the paper dust piles up in the cells in the toner supplying roller 8. The paper dust piled up in the cells in the toner supplying roller 8 may move with the rotation of the toner supplying roller 8 to be supplied together with the toner 10 to the supply portion F of the development roller 5. When the paper dust supplied to the development roller 5 reaches the regulation target portion E and is caught between the development blade 9 and the development roller 5, a gap is formed between the development blade 9 and the development roller 5.

When the gap is formed between the development blade 9 and the development roller 5, the toner 10 the thickness of which is not regulated by the development blade 9 may pass through the gap between the development blade 9 and the development roller 5. In addition, the paper dust held between the development blade 9 and the development roller 5 may stop the toner 10. In either case, a toner coat on the development roller 5 is disturbed to appear as an image defect such as vertical streaks. The vertical streaks are streaks which are prominently visible particularly on a halftone image and formed on the image along a conveying direction of the recording material P. When the toner 10 passes through the gap between the development blade 9 and the development roller 5, black streaks having a density higher than a normal density are observed while, when the toner 10 is stopped by the paper dust, white streaks having a density lower than the normal density are observed. The black streaks and the while streaks may also be observed simultaneously.

Configuration of Contact Brush

Figure 2:
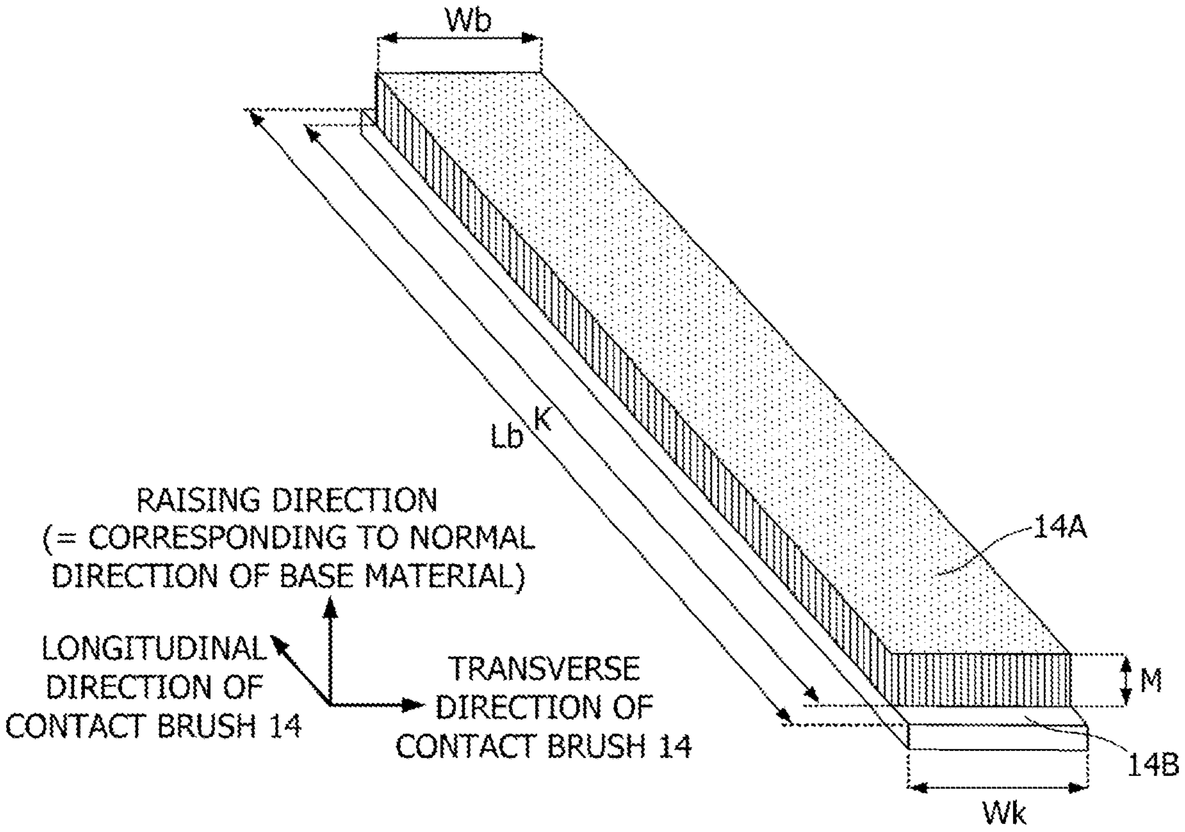
FIG. 2 is a perspective view of a contact brush according to the first embodiment.

Next, with reference to FIG. 2, the contact brush 14 according to the first embodiment intended to prevent a problem encountered when a cleanerless system as described above is used will be described in detail. FIG. 2 is a schematic diagram (perspective diagram) of the contact brush 14 in the first embodiment.

The contact brush 14 includes a raised portion 14A having a plurality of fibers (fibrous members) and a base material (base fabric portion) 14B on which the raised portion 14A is provided. The raised portion 14A is raised in a direction (normal direction) perpendicular to a first surface (upper surface) of the base material 14B. In other words, the fibers provided on the first surface of the base material 14B extend in the direction perpendicular to the first surface of the base material 14B. In the contact brush 14 in the first embodiment, a spun yarn obtained by spinning an acrylic fiber is woven in the base material 14B to provide the base material 14B with the raised portion 14A. As a shape of the brush-like fiber (woven yarn) of the contact brush 14, a crimped shape allows easier catching of the paper dust than a straight shape and improves paper dust collection performance.

A density of the contact brush 14 is preferably determined in consideration of a balance between a passability of the toner 10 and the paper dust collection performance. Specifically, when the density of the contact brush 14 is extremely high, the passability of the toner 10 deteriorates, and the toner 10 may be stuck to the respective contact portions of the toner supplying roller 8 and the contact brush 14. Conversely, when the density of the contact brush 14 is excessively low, the paper dust collection performance deteriorates, and the paper dust may stay in the toner supplying roller 8. Accordingly, the density of the contact brush 14 is preferably selectively determined so as to be able to ensure sufficient paper dust collection performance, while allowing an excellent passability of the toner 10 to be maintained.

In the first embodiment, the density of the contact brush 14 is 160 bundles/inch$^2$. In the first embodiment, a yarn count of the contact brush 14 is 2/32 (two yarns each having a length of 32 km and a thickness corresponding to a weight of 1 kg are twisted together). In the first embodiment, a dimension Wb of the raised portion 14A of the contact brush 14 in a transverse direction (direction parallel with the rotation direction of the toner supplying roller 8) thereof is 5 mm. A dimension Wk of the base material 14B of the contact brush 14 in the transverse direction is 5 mm (the same dimension as that of the raised portion 14A). A dimension Lb of the contact brush 14 in a longitudinal direction (direction perpendicular to the rotation direction of the toner supplying roller 8) thereof is 250 mm. In the longitudinal direction of the contact brush 14, a width of a region K where the raised portion 14A is provided on the base material 14B is 230 mm, and respective regions where the raised portion 14A is not provided are equally provided on both end portions of the base material 14B to have widths of 10 mm. By setting the width of the region K to 230 mm and setting the dimension Wb of the raised portion 14A in the transverse direction to 5 mm, it is possible to ensure a sufficient region where the toner supplying roller 8 and the contact brush 14 are in contact with each other.

In the contact brush 14 in a non-contact state (state where no pressure is placed on the fibers of the raised portion 14A), a direction in which the raised portion 14A extends from the first surface of the base material 14B is referred to as a raising direction. In the first embodiment, a fiber length M of each of the fibers of the raised portion 14A starting at the base material 14B in the raising direction is 6.5 mm. The contact brush 14 is stationarily disposed so as to provide contact between the raised portion 14A and the toner supplying roller on a downstream side of respective contact portions of the development roller 5 and the toner supplying roller 8 in the rotation direction of the toner supplying roller 8. An amount of intrusion of the raised portion 14A into an outer peripheral surface of the toner supplying roller 8 is set to 2.5 mm.

As a material of the brush fiber (woven yarn) serving as the fibrous members of the raised portion 14A, a polyester fiber, a nylon fiber, or the like can be used instead of the acrylic fiber. It is also possible to cause the material of the brush fiber (woven yarn) to contain a conductive material such as carbon and give conductivity thereto. As a fiber of the base material 14B in the first embodiment, a non-conductive polyester fiber is used, but an acrylic fiber, a nylon fiber, or the like can also be used as long as the fiber allows the raised portion 14A to be woven, and the fiber of the base material 14B is not limited thereto. It is also possible to use a configuration in which a resin sheet made of polyester or the like is bonded to the back of the base material 14B of the contact brush 14 to give rigidity to the contact brush 14 and thereby more stabilize the contact. The dimensions of the contact brush 14, the amount of intrusion of the contact brush 14 into the toner supplying roller 8, and the like can also be changed in accordance with the image forming apparatus to be used, and are not limited to such dimensions and an amount of intrusion as mentioned above.

The plurality of fibrous members of the contact brush 14 scrape a foreign substance such as paper dust from the surface of the development roller 5 to remove the foreign substance such as the paper dust from the surface of the development roller 5. The plurality of fibrous members of the contact brush 14 are configured to be able to enter the cells in the toner supplying roller 8. The plurality of fibrous members of the contact brush 14 enter the cells in the toner supplying roller 8, and the plurality of fibrous members of the contact brush 14 scrape the foreign substance such as the paper dust in the cells in the toner supplying roller 8 to remove the foreign substance such as the paper dust in the cells in the toner supplying roller 8. The foreign substance such as the paper dust scraped by the plurality of fibrous members of the contact brush 14 is held between the plurality of fibrous members of the contact brush 14.

Confirmation of Effect

Next, a description will be given of results of image output tests comparatively examined for the first embodiment and a first comparative example. Note that the first comparative example has the same configuration as that of the first embodiment except that the contact brush 14 is not provided in the development device 3. Each of the image output tests is performed under the following conditions. As the recording material P, Vitality (manufactured by Xerox Corporation and having a weighing capacity of 75 g/cm$^2$), which is a letter-sized sheet, is used, and a text pattern having a printing rate of 2% is printed on one surface of each of 5000 sheets at 25 ppm. In addition, a halftone image is printed on the entire surface of every 1000-th printed sheet having upper, lower, left, and right margins each set to 5 mm, and it is evaluated whether or not vertical streaks due to a defective toner coat on the regulation target portion E are formed. Evaluation criteria are such that a halftone image in which streaks (vertical streaks) extending along a sheet passing direction (conveying direction of the recording material P) are not formed is evaluated to be Acceptable, while a halftone image in which at least one vertical streak is formed is evaluated to be Unacceptable.

Table 1 shows the evaluation results. Table 1 shows, for each of the first embodiment and the first comparative example, results of evaluation (presence or absence of the vertical streaks resulting from the defective toner coat) of the evaluated images which are sampled on every 1000-th printed sheet.

TABLE 1

| Number of passed sheets | First comparative example (without contact brush) | First embodiment (with contact brush) |
|---|---|---|
| 1000 | Acceptable | Acceptable |
| 2000 | Acceptable | Acceptable |
| 3000 | Unacceptable | Acceptable |
| 4000 | Unacceptable | Acceptable |
| 5000 | Unacceptable | Acceptable |

As shown in Table 1, in the first comparative example, catching of paper dust in the regulation target portion E occurs at a time when the number of the printed sheets is 3000, and vertical streaks due to the defective toner coat are formed. When the toner container 11 is checked, entrance of the paper dust into the cells near the surface of the toner supplying roller 8 is recognized. The paper dust collected in the toner container 11 piles up in the cells in the toner supplying roller 8 as the number of passed sheets increases. It can be considered that the paper dust supplied together with the toner 10 to the development roller 5 in the supply portion F is caught when reaching the regulation target portion E, and enters the cells near the surface of the toner supplying roller 8. Accordingly, in the first comparative example, when the image output test is continued after the number of the printed sheets reached 3000, the amount of the paper dust piling up in the toner supplying roller 8 further increases to cause a larger number of the vertical streaks.

Meanwhile, in the first embodiment, even at a time when the number of the printed sheets is 5000, the catching of the paper dust in the regulation target portion E does not occur, and no vertical streak is formed. When the toner container 11 is checked, it is recognized that the amount of the paper dust having entered the cells in the toner supplying roller 8 is suppressed, while a large amount of the paper dust is held instead in the contact brush 14.

Figure 4:
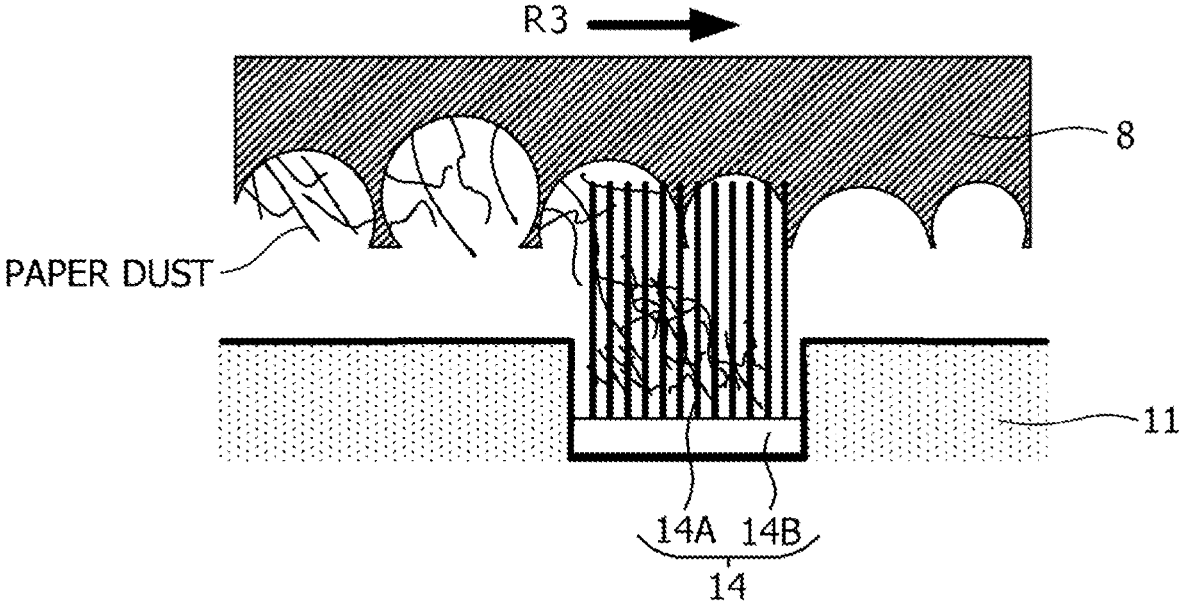
FIG. 4 is a schematic diagram of a toner supplying roller and a contact member according to the first embodiment.

FIG. 4 is a schematic diagram of the toner supplying roller 8 and the contact brush 14 after the image output test described above is performed by using the image forming apparatus in the first embodiment. The contact brush 14 is in contact with the toner supplying roller 8 such that an amount of intrusion of the contact brush 14 into the toner supplying roller 8 is 2.5 mm. Thus, the first embodiment uses a configuration in which the raised portion 14A of the contact brush 14 enters the cells in the toner supplying roller 8. Consequently, the paper dust in the cells in the toner supplying roller 8 is scraped by the raised portion 14A of the contact brush 14 and held in the raised portion 14A. Thus, the configuration of the contact brush 14 and the effect exerted thereby reduce the amount of the paper dust piling up in the toner supplying roller 8 and, since the amount of the paper dust supplied together with the toner 10 to the development roller 5 is reduced, the paper dust is prevented from being caught in the regulation target portion E.

In the first embodiment, the contact brush 14 is disposed in the toner container 11 so as to come into contact with the surface of the toner supplying roller 8 and remove the foreign substance on the surface of the toner supplying roller 8 therefrom. As a result, even when the foreign substance such as the paper dust enters the development device 3, it is possible to prevent the foreign substance such as the paper dust from being supplied together with the toner 10 to the development roller 5 and prevent an image defect due to the defective toner coat on the regulation target portion E. This allows excellent images to be obtained over a long period of time.

Note that, in the first embodiment, the paper sheet is used as the recording material P, and therefore the description has been given of the problem caused by the paper dust. However, the present invention is not limited thereto, and the same effect can be obtained by using the configuration in the first embodiment to solve a problem caused by a foreign substance such as powder generated when, e.g., a plastic sheet or the like is used as the recording material P.

Also, in the first embodiment, a stationary sheet brush is used as the contact brush 14, but the contact brush 14 is not limited to the sheet brush. It may also be possible to use, as the contact brush 14, a brush roller obtained by, e.g., winding a brush sheet into a rolled shape around a core metal and rotatively dispose the contact brush 14 in the toner container 11 such that the contact brush 14 comes into contact with the toner supplying roller 8. In this case also, the raised portion 14A of the contact brush 14 scrapes the paper dust in the cells in the toner supplying roller 8 to be able to provide an effect of reducing an amount of the paper dust piling up in the toner supplying roller 8.

Second Embodiment

Figure 5:
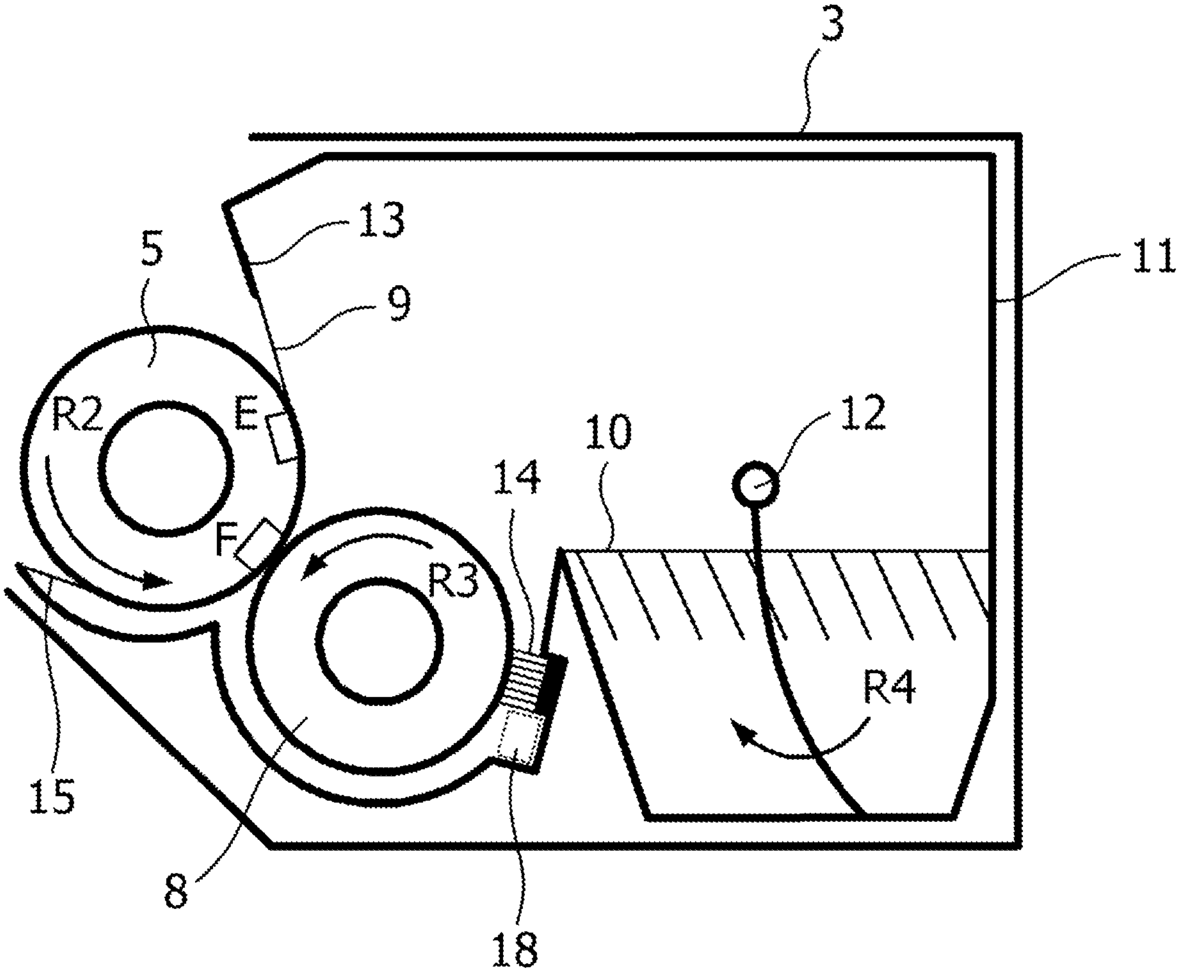
FIG. 5 is an enlarged diagram of a development device according to a second embodiment.

Next, referring to FIG. 5, a description will be given of the second embodiment. FIG. 5 is a schematic diagram illustrating a configuration of the development device 3 in the second embodiment. The development device 3 according to the second embodiment has the same configuration as that in the first embodiment except that the toner container 11 in the second embodiment has a configuration different from that in the first embodiment. Accordingly, a description of the same components as in the first embodiment is omitted by using the same reference numerals.

As described in the first embodiment, the paper dust on the photosensitive drum 1 is collected by the development device 3 to be held in the contact brush 14. Depending on the setting of the life of the development device 3, a larger amount of the paper dust than expected in the first embodiment may be collected by the development device 3. In addition, in these latter days when various types of paper sheets are used, coarse paper sheets such as recycled paper sheets and paper sheets having inappropriately cut end portions have a large amount of fibrous paper dust adhering to cut planes or surfaces of the paper sheets. Accordingly, during passage of the paper sheets, a larger amount of the paper dust is generated. When the recording material P which may generate a large amount of paper dust is used, it is possible that the paper dust in excess of the amount of paper dust that can be held in the contact brush 14 may be collected in the development device 3. In that case, the paper dust that cannot be held in the contact brush 14 is stopped on an upstream side of the respective contact portions of the toner supplying roller 8 and the contact brush 14 in the rotation direction (direction indicated by the arrow R3 in FIG. 5) of the toner supplying roller 8 to be scraped. As a result, the paper dust overflows on the upstream side of the respective contact portions of the toner supplying roller 8 and the contact brush 14 in the rotation direction of the toner supplying roller 8.

When the amount of the overflown paper dust that cannot be held by the contact brush 14 increases, the gap between the toner supplying roller 8 and the toner container 11 is narrowed to interrupt the circulation of the toner 10 around the toner supplying roller 8. Consequently, the amount of the toner retrieved by the toner supplying roller 8 on the downstream side of the supply portion F in the rotation direction of the toner supplying roller 8 becomes insufficient. Therefore, even when the recording material P which may generate a large amount of paper dust is used, it is preferable to reduce the amount of the paper dust to be supplied together with the toner 10 to the development roller 5.

Figure 6:
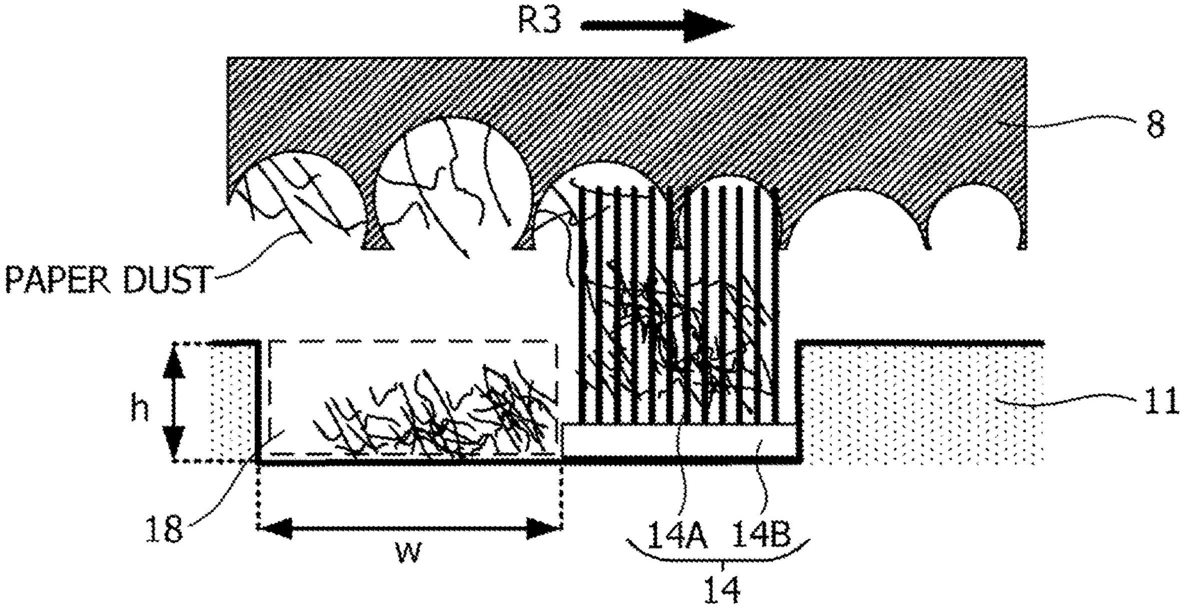
FIG. 6 is a schematic diagram of a toner supplying roller and a contact member according to the second embodiment.

As illustrated in FIGS. 5 and 6, the toner container 11 has the contact brush 14 in contact with the toner supplying roller 8 and a foreign substance holding region 18 on the upstream side of the respective contact portions of the surface of the toner supplying roller 8 and the contact brush 14 in the rotation direction of the toner supplying roller 8. The foreign substance holding region 18 serving as a holding region is a region outwardly recessed from the toner container 11 around the toner supplying roller 8 and is set in a range which does not affect the circulation of the toner 10 around the toner supplying roller 8 described above. The following is dimensions of the foreign substance holding region 18 in the second embodiment. The foreign substance holding region 18 has a height h (depth of a groove in the toner container 11) of 4.0 mm. The foreign substance holding region 18 has a length w of 6.0 mm in the rotation direction of the toner supplying roller 8. The foreign substance holding region 18 has a width of 250 mm in a longitudinal direction (direction perpendicular to the rotation direction of the toner supplying roller 8), similarly to the contact brush 14.

Confirmation of Effects

A description will be given of results of image output tests comparatively examined for the second embodiment and a second comparative example. Note that the second comparative example has the same configuration as that of the second embodiment except that the contact brush 14 and the foreign substance holding region 18 are not provided in the development device 3. Each of the image output tests is performed under the following conditions. As the recording material P which may generate a large amount of paper dust, Century Star Paper (manufactured by Century Textiles & Industries Corporation), which is a A4-sized sheet, is used, and a text pattern having a printing rate of 2% is printed on one surface of each of 5000 sheets at 25 ppm. In addition, a halftone image is printed on the entire surface of every 1000-th sheet having upper, lower, left, and right margins each set to 5 mm, and it is evaluated whether or not vertical streaks due to a defective toner coat on the regulation target portion E are formed. Evaluation criteria are such that a halftone image in which streaks (vertical streaks) extending along a sheet passing direction (conveying direction of the recording material P) are not formed is evaluated to be Acceptable, while a halftone image in which at least one vertical streak is formed is evaluated to be Unacceptable.

Table 2 shows the evaluation results. Table 2 shows, for each of the second embodiment and the second comparative example, results of evaluation (presence or absence of the vertical streaks resulting from the defective toner coat) of the evaluated images which are sampled on every 1000-th printed sheet.

TABLE 2

| Durability number of sheets | Second comparative example (without contact brush and foreign material holding region) | Second embodiment (with contact brush and foreign material holding region) |
|---|---|---|
| 1000 | Unacceptable | Acceptable |
| 2000 | Unacceptable | Acceptable |
| 3000 | Unacceptable | Acceptable |
| 4000 | Unacceptable | Acceptable |
| 5000 | Unacceptable | Acceptable |

As shown in Table 2, in the second comparative example, the catching of the paper dust in the regulation target portion E occurs at a time when the number of the printed sheets is 1000, and vertical streaks due to the defective toner coat are formed. When the toner container 11 is checked, the entrance of the paper dust into the cells near the surface of the toner supplying roller 8 is recognized. Since the amount of the paper dust collected in the toner container 11 is large, even though the number of passed sheets is small, the paper dust piles up in the cells in the toner supplying roller 8. It can be considered that the paper dust supplied together with the toner 10 to the development roller 5 in the supply portion F is caught on reaching the regulation target portion E and enters the cells near the surface of the toner supplying roller 8. Accordingly, in the second comparative example, when the image output test is continued after the number of the printed sheets reaches 1000, the amount of the paper dust piling up in the toner supplying roller 8 further increases to cause a larger number of the vertical streaks.

Meanwhile, in the second embodiment, even at a time when the number of the printed sheets is 5000, the catching of the paper dust in the regulation target portion E does not occur, and no vertical streak is formed. When the toner container 11 is checked, it is recognized that the amount of the paper dust having entered the cells in the toner supplying roller 8 is suppressed, while a large amount of the paper dust is held instead in each of the contact brush 14 and the foreign substance holding region 18.

FIG. 6 is a schematic diagram of the toner supplying roller 8, the contact brush 14, and the foreign substance holding region 18 after the image output test described above is performed by using the image forming apparatus in the second embodiment. The paper dust in the cells in the toner supplying roller 8 is scraped by the raised portion 14A of the contact brush 14 and held in the raised portion 14A. Since the amount of the paper dust collected in the development device 3 is large, the paper dust that cannot be held in the raised portion 14A is stopped on the upstream side of the respective contact portions of the toner supplying roller 8 and the contact brush 14 in the rotation direction of the toner supplying roller 8 to be scraped. As a result, the paper dust overflows on the upstream side of the respective contact portions of the toner supplying roller 8 and the contact brush 14 in the rotation direction of the toner supplying roller 8.

The paper dust overflown from the contact brush 14 enters the foreign substance holding region 18 provided on the upstream side of the respective contact portions of the toner supplying roller 8 and the contact brush 14 in the rotation direction of the toner supplying roller 8. Since the height h of the foreign substance holding region 18 is set to 4.0 mm herein, the foreign substance holding region 18 does not affect the circulation of the toner 10 around the toner supplying roller 8. Accordingly, the paper dust having entered the foreign substance holding region 18 does not circulate together with the toner, but is held in the foreign substance holding region 18. Thus, the foreign substance holding region 18 holds a foreign substance such as the paper dust removed from the surface of the toner supplying roller 8. In addition, the paper dust overflown from the contact brush 14 allows the function of the contact brush 14 to be maintained. Thus, the configurations of the contact brush 14 and the foreign substance holding region 18 and the effects exerted thereby reduce the amount of the paper dust piling up in the toner supplying roller 8 and, since the amount of the paper dust supplied together with the toner 10 to the development roller 5 is reduced, the paper dust is prevented from being caught in the regulation target portion E.

The toner container 11 in the second embodiment includes the contact brush 14 in contact with the toner supplying roller 8 and the foreign substance holding region 18 on the upstream side of the respective contact portions of the toner supplying roller 8 and the contact brush 14 in the rotation direction of the toner supplying roller 8. The contact brush 14 removes the foreign substance from over the surface of the toner supplying roller 8, and the foreign substance overflown from the contact brush 14 is held in the foreign substance holding region 18. As a result, even when a large amount of the foreign sub stance, such as the paper dust, enters the development device 3, it is possible to prevent the foreign substance such as the paper dust from being supplied together with the toner 10 to the development roller 5 and prevent an image defect due to the defective toner coat in the regulation target portion E. Consequently, it is possible to obtain excellent images over a long period of time.

In the second embodiment also, a stationary sheet brush is used as the contact brush 14, but the contact brush 14 is not limited to a sheet brush. It may also be possible to use, as the contact brush 14, a brush roller obtained by, e.g., winding a brush sheet into a rolled shape around a core metal and rotatively dispose the contact brush 14 in the toner container 11 such that the contact brush 14 comes into contact with the toner supplying roller 8. In this case also, the raised portion 14A of the contact brush 14 scrapes the paper dust in the cells in the toner supplying roller 8 to be able to provide an effect of reducing an amount of the paper dust piling up in the toner supplying roller 8. In addition, by using the configuration of the second embodiment to solve a problem caused by a foreign substance such as powder generated when a plastic sheet or the like is used as the recording material P, the same effect can be obtained.

According to the present invention, it is possible to prevent a foreign substance having entered a developer container from being supplied together with a developer to a developing member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-095461, filed on Jun. 1, 2020, which is hereby incorporated by reference herein in its entirety.

What is claimed is:

1. An image forming apparatus forming an image on a recording material, the image forming apparatus comprising:

a developer container that contains developer therein;

a developer supplying member that is rotatable and provided in the developer container; and a brush provided in the developer container and in contact with a surface of the developer supplying member, wherein the brush includes a plurality of fibers and a base portion on which the plurality of fibers is provided, wherein the developer container includes a recess portion, and the brush is stationarily disposed in the recess portion and the base portion is fixed by contacting a surface of the developer container such that the brush is fit into the recess portion.

2. The image forming apparatus according to claim 1, wherein the fibers are configured scrape a foreign substance on the surface of the developer supplying member to remove the foreign substance from the surface of the developer supplying member.

3. The image forming apparatus according claim 2, wherein the foreign substance is scraped by the plurality of fibers.

4. The image forming apparatus according to claim 1, wherein the brush has a facing surface that faces the surface of the developer supplying member, and wherein the fibers of the plurality of fibers are provided on the facing surface and extend in a direction perpendicular to the facing surface.

5. The image forming apparatus according to claim 1, wherein the distance between the surface of the developer supplying member and a surface of the base portion is a distance between an outermost surface of the developer supplying member and the surface of the base portion.

6. The image forming apparatus according to claim 1, wherein, when a direction in which the plurality of fibers extends from a surface of the base portion is defined as a raising direction, a fiber length of each of the fibers of the plurality of fibers starting at the base portion in the raising direction is longer than a distance between the surface of the developer supplying member and the surface of the base portion.

7. The image forming apparatus according to claim 1, wherein a shape of the fibers of plurality of the fibers is crimped.

8. An image forming apparatus forming an image on a recording material, the image forming apparatus comprising:

a developer container that contains developer therein;

a developer supplying member that is rotatable and provided in the developer container; and a brush provided in the developer container and in contact with a surface of the developer supplying member, wherein the brush includes a plurality of fibers extending from a first surface of a base portion on which the plurality of fibers is provided, and the base portion includes a second surface on an opposite side of the base portion from the first surface, wherein the developer container includes a recess portion, and the base portion is fixed by providing the second surface to a surface of the developer container such that the brush is fit into the recess portion.

* * * * *